US012694870B2

(12) United States Patent
Intrator et al.

(10) Patent No.: US 12,694,870 B2
(45) Date of Patent: Jul. 28, 2026

(54) SYSTEM AND METHOD FOR SCORE NORMALIZATION

(71) Applicant: Nice Ltd., Ra'anana (IL)

(72) Inventors: Lior Intrator, Beer Yaakov (IL); Tal Haguel, Petach Tikva (IL)

(73) Assignee: Nice Ltd. (IL)

( * ) Notice: Subject to any disclaimer, the term of this patent is extended or adjusted under 35 U.S.C. 154(b) by 568 days.

(21) Appl. No.: 18/312,146

(22) Filed: May 4, 2023

(65) Prior Publication Data

US 2024/0371368 A1 Nov. 7, 2024

(51) Int. Cl.
| | |
|---|---|
| *G10L 15/22* | (2006.01) |
| *G06N 20/00* | (2019.01) |
| *G10L 15/10* | (2006.01) |
| *G10L 15/183* | (2013.01) |

(52) U.S. Cl.
CPC ........... *G10L 15/183* (2013.01); *G06N 20/00* (2019.01); *G10L 15/10* (2013.01); *G10L 15/22* (2013.01)

(58) Field of Classification Search
CPC ....... G10L 15/22; G10L 15/10; G10L 15/183; G06N 20/00
See application file for complete search history.

(56) References Cited

PUBLICATIONS

Jia, et al. "A Comparison on Histogram Based Image Matching Methods," IEEE, 2006. (Year: 2006).*

Zhu, et al. "Classification by Estimating the Cumulative Distribution Function for Small Data," IEEE Access, Mar. 14, 2023. (Year: 2023).*
Li, et al. "Improving GAN with inverse cumulative distribution function for tabular data synthesis," Elsevier Neurocomputing, 2021. (Year: 2021).*
Zhu, et al. "Classification by Estimating the Cumulative Distribution Function for Small Data," IEEE Access, Mar. 14, 2023—see attached reference in the previous Office action. (Year: 2023).*
Li, et al. "Improving GAN with inverse cumulative distribution function for tabular data synthesis," Elsevier Neurocomputing, 2021—see attached reference in the previous Office action. (Year: 2021).*
MathWorks, Machine Learning Models, What is a machine learning model?, downloaded from website https://www.mathworks.com/discovery/machine-learning-models.html, Printed on May 4, 2023, 20 pages.

* cited by examiner

*Primary Examiner* — Feng-Tzer Tzeng

(57) ABSTRACT

Systems and methods for mapping a set of output values of a first learning model to a distribution of a set of output values of a second learning model include: calculating a distribution function for a set of source values; calculating a distribution function for a set of target values; calculating a set of quantiles for each distribution function; using the set of quantiles in a linear interpolation of the set of target values to obtain a source values array and a matched interpolated values array; calculating an absolute distance from each value in the source values array to the first set of output values of the first learning model; determining a corresponding value in the matched interpolated values array corresponding to a value in the source values array which has the smallest said absolute distance; and outputting a set of matched values.

14 Claims, 8 Drawing Sheets

500

| | |
|---|---|
| CALCULATING A FIRST DISTRIBUTION FUNCTION FOR A SET OF SOURCE VALUES | 502 |
| CALCULATING A SECOND DISTRIBUTION FUNCTION FOR A SET OF TARGET VALUES | 504 |
| CALCULATING A FIRST SET OF QUANTILES FOR THE FIRST DISTRIBUTION FUNCTION, AND A SECOND SET OF QUANTILES FOR THE SECOND DISTRIBUTION FUNCTION | 506 |
| USING SAID FIRST AND SECOND SET OF QUANTILES IN A LINEAR INTERPOLATION OF THE SET OF TARGET VALUES TO OBTAIN A SOURCE VALUES ARRAY AND A MATCHED INTERPOLATED VALUES ARRAY | 508 |
| CALCULATING AN ABSOLUTE DISTANCE FROM EACH VALUE IN THE SOURCE VALUES ARRAY TO THE FIRST SET OF OUTPUT VALUES OF THE FIRST LEARNING MODEL | 510 |
| DETERMINING A CORRESPONDING VALUE IN THE MATCHED INTERPOLATED VALUES ARRAY CORRESPONDING TO A VALUE IN THE SOURCE VALUES ARRAY WHICH HAS THE SMALLEST SAID ABSOLUTE DISTANCE | 512 |
| OUTPUTTING A SET OF MATCHED VALUES | 514 |

Matched
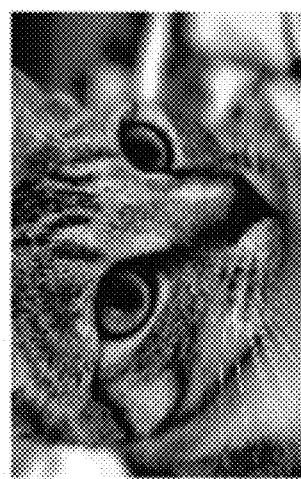
Reference
Fig. 1
Source
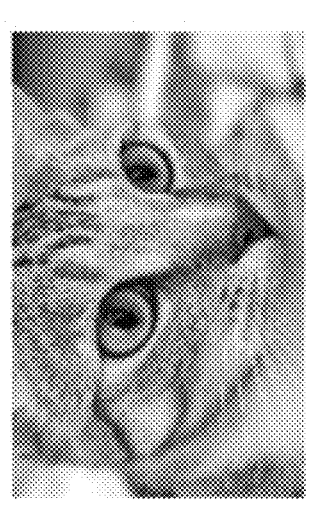

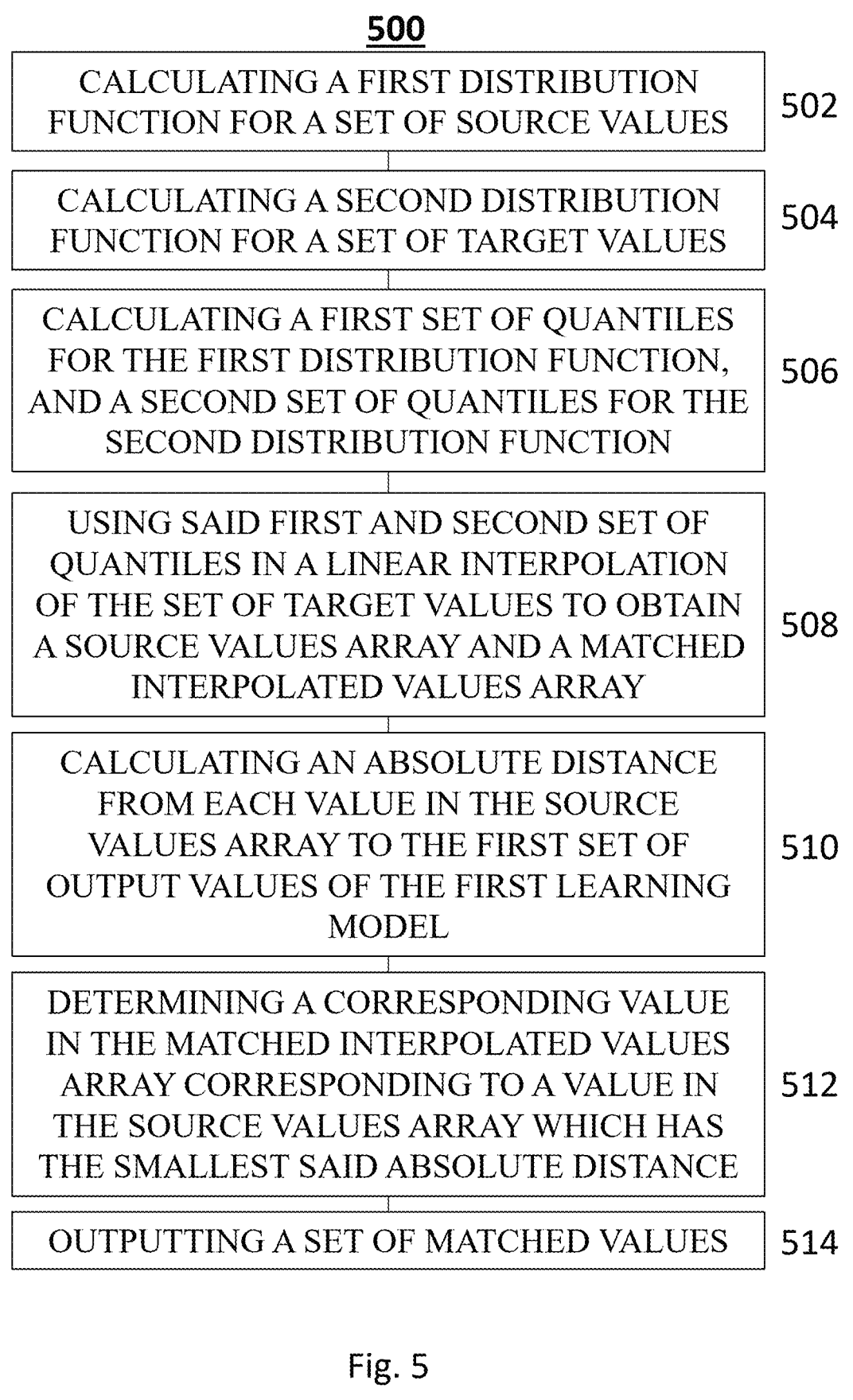

500

| CALCULATING A FIRST DISTRIBUTION FUNCTION FOR A SET OF SOURCE VALUES | 502 |

| CALCULATING A SECOND DISTRIBUTION FUNCTION FOR A SET OF TARGET VALUES | 504 |

| CALCULATING A FIRST SET OF QUANTILES FOR THE FIRST DISTRIBUTION FUNCTION, AND A SECOND SET OF QUANTILES FOR THE SECOND DISTRIBUTION FUNCTION | 506 |

| USING SAID FIRST AND SECOND SET OF QUANTILES IN A LINEAR INTERPOLATION OF THE SET OF TARGET VALUES TO OBTAIN A SOURCE VALUES ARRAY AND A MATCHED INTERPOLATED VALUES ARRAY | 508 |

| CALCULATING AN ABSOLUTE DISTANCE FROM EACH VALUE IN THE SOURCE VALUES ARRAY TO THE FIRST SET OF OUTPUT VALUES OF THE FIRST LEARNING MODEL | 510 |

| DETERMINING A CORRESPONDING VALUE IN THE MATCHED INTERPOLATED VALUES ARRAY CORRESPONDING TO A VALUE IN THE SOURCE VALUES ARRAY WHICH HAS THE SMALLEST SAID ABSOLUTE DISTANCE | 512 |

| OUTPUTTING A SET OF MATCHED VALUES | 514 |

Fig. 5

SYSTEM AND METHOD FOR SCORE NORMALIZATION

FIELD OF THE INVENTION

The present invention relates generally to outputs of learning models, in particular to normalizing different outputs of one or more learning models.

BACKGROUND OF THE INVENTION

Machine learning models, such as the Enlighten AI model by NICE Ltd., may provide prediction scores as their output. These scores might drift and change over time due to, for example, changes in model version, advances in automatic speech recognition (ASR), changes in the type of model, and changes in input data (e.g. data having different distribution ranges such as –1 to 1 compared to –inf to inf).

The drift can cause inconsistencies in the scores, which can negatively impact the ability of users to interpret and use the scores. For example, scores from agent behavior models may be used to make decisions about the agents.

Existing methods for handling score drift and matching scores include mean and standard deviation calculations per use case, which is both low-quality and high-effort (because thresholds must be defined per specific use case) and is not a general solution.

The histogram matching algorithm, known from the field of computer vision, is a fast and efficient method for "calibrating" one image to match another. This technique is used to adjust the intensity levels of an image so that its histogram (a graphical representation of the distribution of pixels in an image) matches a specified target histogram. The histogram matching algorithm compares the histograms of two images and adjusts the intensity levels of the image being processed (the source image) so that its histogram is as similar as possible to that of the reference image.

A histogram is an approximate representation of the distribution of numerical data. To construct a histogram, a first step may be to "bin" (or "bucket") the range of values—that is, divide the entire range of values into a series of intervals—and then count how many values fall into each interval. The bins are usually specified as consecutive, non-overlapping intervals of a variable. The bins (intervals) are adjacent and are often (but not required to be) of equal size. If the bins are of equal size, a bar may be drawn over the bin with height proportional to the frequency. representing the number of cases in each bin. A histogram may also be normalized to display "relative" frequencies showing the proportion of cases that fall into each of several categories, with the sum of the heights equaling 1. However, bins need not be of equal width; in that case, the erected rectangle may be defined to have its area proportional to the frequency of cases in the bin. The vertical axis is then not the frequency but frequency density—the number of cases per unit of the variable on the horizontal axis. As the adjacent bins leave no gaps, the rectangles of a histogram may touch each other to indicate that the original variable is continuous. Histograms may give a rough sense of the density of the underlying distribution of the data, and are often used for density estimation, e.g. estimating the probability density function of the underlying variable. The total area of a histogram used for probability density may be normalized to 1. If the length of the intervals on the x-axis are all 1, then a histogram may be identical to a relative frequency plot.

To illustrate an application of the histogram matching algorithm, FIG. 1 shows three images: source, reference and matched. It is desired to match the pixel distribution (e.g. colors) of the source image (depicting a cat) to the pixel distribution of the reference image (depicting a cup of coffee). The matched image is the result, depicting the source cat image with the pixel distribution of the reference coffee image. The results of the histogram matching algorithm are generally used once and discarded, because of the high degree of specificity in the relationship between the source and reference image: for example an entirely different result would arise from matching a source image of a dog with the same reference image of the coffee. The results are thus not usable for consistent application.

There is a need in the art to improve consistency between prediction scores from different versions and/or different types of learning models.

SUMMARY

Embodiments of the invention include a computer implemented method for mapping a first set of output values of a first learning model to a distribution of a second set of output values of a second learning model, the method including, using a computer processor: calculating a first distribution function for a set of source values; calculating a second distribution function for a set of target values; calculating a first set of quantiles for the first distribution function, and a second set of quantiles for the second distribution function; using said first and second set of quantiles in a linear interpolation of the set of target values to obtain a source values array and a matched interpolated values array; calculating an absolute distance from each value in the source values array to the first set of output values of the first learning model; determining a corresponding value in the matched interpolated values array corresponding to a value in the source values array which has the smallest said absolute distance; and outputting a set of matched values.

According to some embodiments, the set of source values and the set of target values include a representation of continuous data values (such as floating point arithmetic), and calculating said first and second distribution functions includes calculating a first cumulative distribution function (CDF) for a first plurality of histogram scores for the set of source values, and calculating a second CDF for a second plurality of histogram scores for the set of target values.

According to some embodiments, calculating said first and second sets of quantiles includes dividing the first distribution function by the size of the set of source values and dividing the second distribution function by the size of the set of target values.

According to some embodiments, the first and second set of output values of the first and second learning model include prediction scores for one or more monitored variables monitored based on natural language processing (NLP) of at least one of a transcript, or an audio recording, of an interaction between an agent and a customer.

According to some embodiments, the interaction is one of: a phone conversation, one or a plurality of emails, one or a plurality of text messages, one or a plurality of social media comments, one or a plurality of web chat messages, an audio transcription, or a textual representation of a digital channel.

According to some embodiments, the set of matched values is used in automatically determining agent performance based on one or more thresholds defined for the distribution of the second set of output values of the second learning model.

According to some embodiments, the first and second set of output values of the first and second learning models include prediction scores for one or more monitored variables monitored based on natural language processing (NLP) of at least one of a transcript, or an audio recording, of an interaction between a customer and an interactive voice response (IVR), and wherein the set of matched values is used in automatically routing a call based on one or more thresholds defined for the distribution of the second set of output values of the second learning model.

According to some embodiments, the first and second learning models are one of: the same type, or a different type.

According to some embodiments, the type is one of: a convolutional neural network (CNN), a support vector machine (SVM), k-nearest neighbor (KNN), generative additive model (GAM), a decision tree, neural network, or deep neural network.

Embodiments of the invention include a method for transforming output data of a first learning function to a distribution of output data of a second learning function, the method including: calculating, by at least one processor, a first cumulative distribution function (CDF) for a set of source data from the first learning function, and a second cumulative distribution function (CDF) for a set of target data from the second learning function; using said first and second CDFs, by the at least one processor, in a linear interpolation evaluated at each value of the set of target data to obtain a transformed set of data; and outputting the transformed set of data.

According to some embodiments, the second learning function is a previous version of the first learning function.

Some embodiments of the invention include a system for mapping a first set of output values of a first learning model to a distribution of a second set of output values of a second learning model, the system including: at least one processor; and a memory containing instructions which, when executed by the at least one processor, cause the at least one processor to: calculate a first distribution function for a set of source values; calculate a second distribution function for a set of target values; calculate a first set of quantiles for the first distribution function, and a second set of quantiles for the second distribution function; use said first and second set of quantiles in a linear interpolation of the set of target values to obtain a source values array and a matched interpolated values array; calculate an absolute distance from each value in the source values array to the first set of output values of the first learning model; determine a corresponding value in the matched interpolated values array corresponding to a value in the source values array which has the smallest said absolute distance; and output a set of matched values.

According to some embodiments, the set of source values and the set of target values include a representation of continuous data values (such as floating point arithmetic), and wherein the processor is configured to calculate said first and second distribution functions by calculating a first cumulative distribution function (CDF) for a first plurality of histogram scores for the set of source values, and calculate a second CDF for a second plurality of histogram scores for the set of target values.

According to some embodiments, the at least one processor is configured to calculate said first and second sets of quantiles by dividing the first distribution function by the size of the set of source values and by dividing the second distribution function by the size of the set of target values.

According to some embodiments, the first and second set of output values of the first and second learning models include prediction scores for one or more monitored variables monitored based on natural language processing (NLP) of at least one of a transcript, or an audio recording, of an interaction between an agent and a customer.

According to some embodiments, the interaction is one of: a phone conversation, one or a plurality of emails, one or a plurality of text messages, one or a plurality of social media comments, one or a plurality of web chat messages, an audio transcription, or a textual representation of a digital channel.

According to some embodiments, the set of matched values is used in automatically determining agent performance based on one or more thresholds defined for the distribution of the second set of output values of the second learning model.

According to some embodiments, the first and second set of output values of the first and second learning models include prediction scores for one or more monitored variables monitored based on natural language processing (NLP) of at least one of a transcript, or an audio recording, of an interaction between a customer and an interactive voice response (IVR), and wherein the at least one processor is configured to automatically use the set of matched values to automatically route a call based on one or more thresholds defined for the distribution of the set of output values of the second learning model.

According to some embodiments, the first and second learning models are one of: the same type, or a different type.

According to some embodiments, the type is one of: a convolutional neural network (CNN), a support vector machine (SVM), k-nearest neighbor (KNN), generative additive model (GAM), a decision tree, neural network, or deep neural network.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

FIG. 1 shows a source, a reference, and a matched image using histogram matching, as is known in the art;

FIG. 5 shows a flowchart of a method according to some embodiments of the invention;

Figure 2:
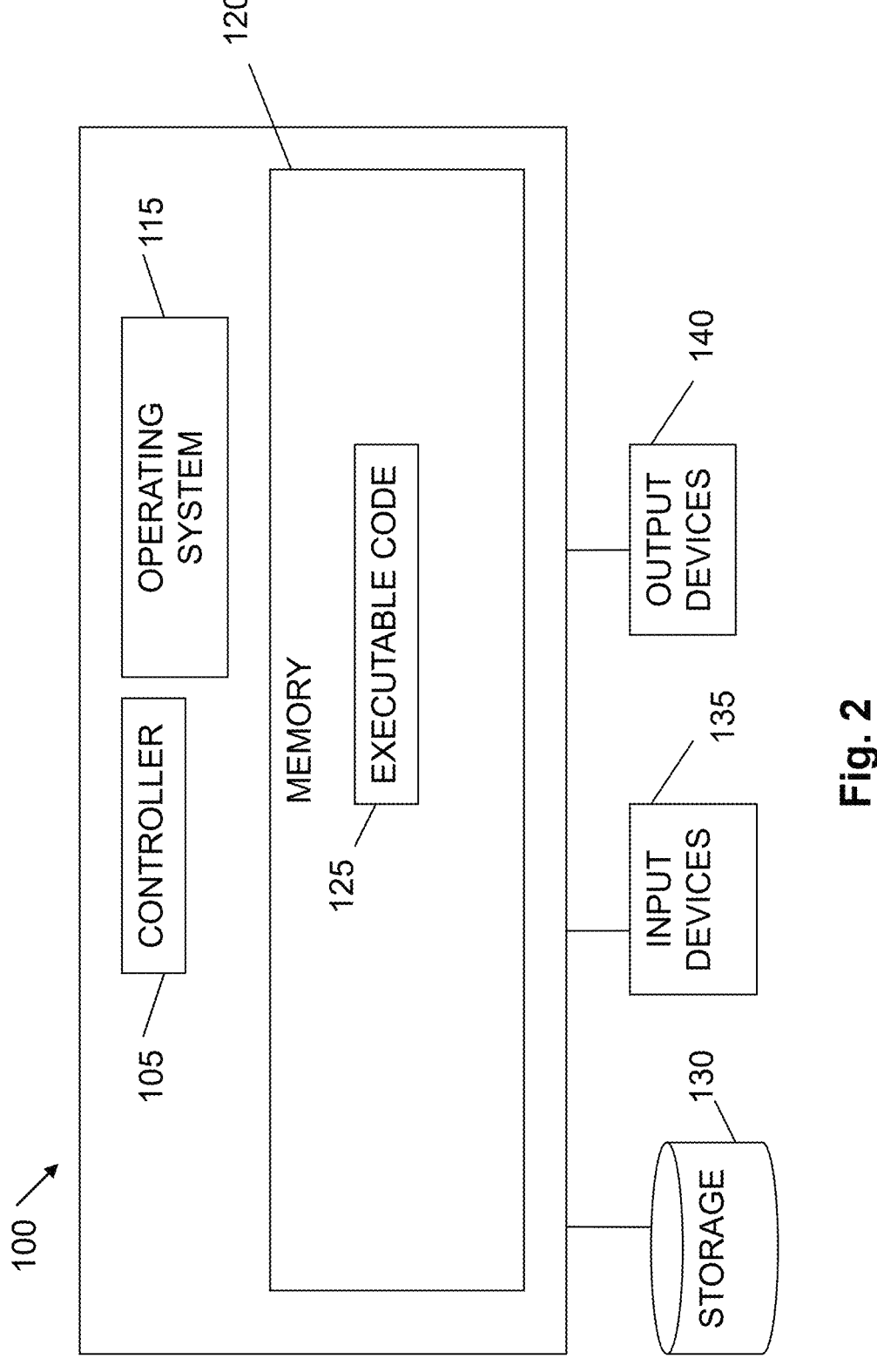
FIG. 2 shows a high-level block diagram of an exemplary computing device which may be used with embodiments of the present invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Embodiments of the invention relate generally to mapping scores output from a model (such as a machine learning model) and managing the drift in such scores, e.g. over time or across different input data. Embodiments may improve consistency and ease of use for users of the models.

Some embodiments of the invention use an algorithm modified from the histogram matching algorithm in order to consistently map or normalize scores output between different versions and/or types of model. A histogram matching algorithm for images is not effective as-is for the mapping of scores output from a model such as a machine learning model for several reasons.

Firstly, in image calibration, the transformation function is generally used only for one image and then discarded. However, for the purposes of embodiments of the present invention it would be advantageous to make this transformation function generalizable so that it can be applied to any new interactions that arrive later.

Secondly, the data types for image processing are discrete with a range of e.g. 0-255 (e.g. pixel integer values), while natural language processing (NLP) data, such as prediction scores, are typically continuous with a range of –inf to inf (e.g. any real-valued number between $-\infty$ and $\infty$) and so may be represented using floating point (FP) arithmetic. Accordingly, whilst image processing may use granular 0-255 integer values, embodiments of the invention may use larger floating-point ranges, which may approximate continuous ranges of phenomena such as NLP scores.

Thirdly, an image may have, e.g. three channels, e.g. RGB (red/green/blue), whereas NLP data is typically one-dimensional.

Embodiments of the invention overcome these challenges using a histogram matching algorithm which may work with NLP or other data, for example data of transcripts of audio calls in contact centers, as well as digital chats.

While embodiments are discussed in the context of agents, interactions and contact center data, embodiments of the invention are applicable to altering ML models used generally, and in other contexts. Thus embodiments may improve the functioning of ML models and neural networks generally.

Embodiments of the invention may involve the training or use of learning models, such as machine learning models. Machine learning models used may include neural networks and deep learning models inspired by but differing from the structure of an organic human brain. Where it is understood that deep learning models are a subset of machine learning models, further reference herein to machine learning should be understood as referring also, in some embodiments, to deep learning models and/or neural networks.

As used herein, "Call Center" may refer to a centralized office used for receiving or transmitting a large volume of enquiries by telephone. An inbound call center may be operated by a company (e.g. a tenant) to administer incoming product or service support or information enquiries from consumers.

As used herein, "Contact Center" may refer to a call center which handles other types of communications (also referred to herein as interactions) other than voice telephone calls, for example, email, message chat, SMS, etc. Reference to call center should be taken to be applicable to contact center.

As used herein, an "Agent" may be a contact center employee that answers incoming contacts, handles customer requests and so on.

As used herein, a "Customer" may be the end user of a contact center. They may be customers of the company that require some kind of service or support.

As used herein, "Work Force Management (WFM)" may refer to an integrated set of processes that a company uses to optimize the productivity of its employees. WFM involves effectively forecasting labor requirements and creating and managing staff schedules to accomplish a particular task on a day-to-day and hour-to-hour basis. WFM may include the use of one or more models, for example one or more machine learning and/or artificial intelligence models (such as Enlighten AI by NICE Ltd.) to monitor agent activity and make predictions.

Prediction models, such as machine learning models, may employ natural language processing (NLP) techniques to analyze interactions between customers and agents. An interaction may include, for example, one or more phone conversations, one or a plurality of emails, one or a plurality of text messages (e.g. short message service SMS text messages), one or a plurality of social media comments (e.g. a series of replies on a Twitter post, Facebook post, Instagram post, LinkedIn post, YouTube video, etc.), one or a plurality of web chat messages (e.g. WhatsApp messages, integrated chat widget), or other communications.

Such models may receive as input an audio file and/or text file. For example, an audio file may be an MP3 recording of a telephone conversation between an agent and a customer. A text file may be, for example, a TXT file which is a transcript of a telephone conversation between an agent and a customer. A text file may also be a textual representation of a digital channel, such as email, webchat, social media comments/post etc. In some embodiments, a prediction model may receive an image as input, and may use an optical character recognition (OCR) algorithm to detect text in the image and process that text using NLP techniques.

FIG. 2 shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or data such as interaction data, agent identification, agent sentiment etc.

Executable code 125 may be any application, program, process, task, or script. Executable code 125 may be executed by controller 105 possibly under control of operating system 115. For example, executable code 125 may be or execute one or more applications performing methods as disclosed herein, such as a machine learning model, or a process providing input to a machine learning model. In some embodiments, more than one computing device 100 or components of device 100 may be used. One or more processor(s) 105 may be configured to carry out embodiments of the present invention by, for example, executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

Figure 3:
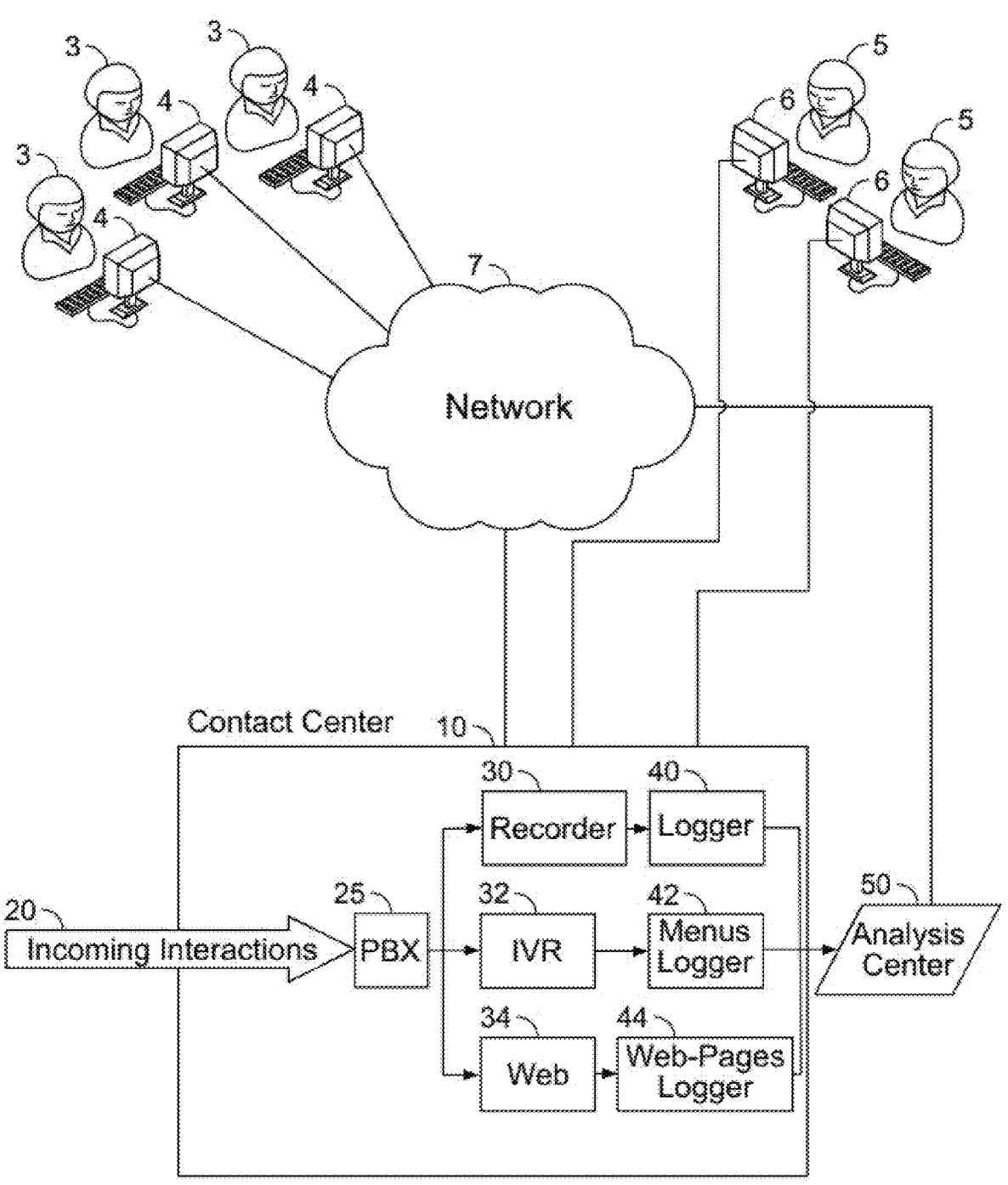
FIG. 3 shows a block diagram of a system for recording and analyzing interaction data according to an embodiment of the present invention.

FIG. 3 is a block diagram of a system for recording and analyzing interaction data according to an embodiment of the present invention. While FIG. 3 shows a system creating and recording interactions or communications at a contact center, interactions can be created in other ways. While examples are given in the context of evaluating agents and interactions, embodiments of the invention may be used in the context of other environments, such as evaluating workers not at a call center. Embodiments of the invention may also be used in contexts other than evaluating agents, for example for routing incoming communications. While data describing interactions is described herein, in other embodiments work product other than interactions may be evaluated. Incoming interactions 20 among people 3 (e.g., telephone calls, emails, web chat, Interactive Voice Response (IVR) interactions, etc.) and agents 5 may enter a contact center 10 and be routed for example by a PBX (private branch exchange) 25 or other equipment to relevant systems, such as interactive voice response (IVR) block or processor 32. Internet sessions or web block 34 and voice interactions block or recorder 30. People 3 (such as a customer) may operate user equipment 4 to communicate with agents 5 via contact center 10; and agents 5 may operate agent terminals 6 for that communication and other purposes.

Contact center 10 may be, for example, maintained or operated by a company (e.g. a bank, a store, an online retailer), government or other organization. Interaction data may be stored, e.g., in files and/or databases: for example logger 40, menus logger 42, and web-page logger 44 may record information related to interactions, such as the content or substance of interactions (e.g. recordings and/or transcripts of telephone calls, textual representations of digital channels, a text-searchable image etc.), metadata (e.g. telephone numbers used, customer identification (ID), etc.), and quality metrics. The data from contact center 10 may be output, sent or exported to an analysis center 50, typically periodically, e.g. once a day. Analysis center 50 may be part of contact center 10, or external to and/or remotely located from contact center 10. The transfer may be via, for example, SFTP (Secure File Transfer Protocol) but may be via other methods.

Analysis center 50 may include one or more models, such as machine learning models, for analysing the collected data. One or more models may produce an output, such as one or more prediction scores. The distribution of these outputs may be used as part of a standard for determining one or more actions, such as call routing or evaluating agent performance.

The data exported to analysis center 50 may be formatted, extracted and/or normalized to be data that represents features of interactions, such as quality metrics characterising attributes of the interaction. Data may be stored in various formats, such as one tuple, representing an interaction session, per row, or other formats. Interactions may include or be associated with other data, such as metadata describing the customer identification, channel identification (e.g. telephone number), start and/or stop time, duration in time of the interaction, or other data. While the creation or extraction of data from various interactions may be performed by contact center 10, such data may be created or extracted by another entity such as analysis center 50. In other embodiments, interactions may be represented with other or more information. For example, an interaction may be a vector of features based on the actual interaction such as the start time, end time, customer ID, channel, contact reason, etc.

One or more networks 7 may connect equipment or entities not physically co-located, for example connecting user equipment 4 to contact center 10, and contact center 10 to analysis center 50. Networks 7 may include for example telephone networks, the Internet, or other networks. While in FIG. 3 contact center 10 is shown passing data to analysis center 50, these entities may communicate via a network such as networks 7.

Web block 34 may support web interactions over the Internet (e.g. operate web pages which may be executed in part on user equipment), IVR block 32 may provide menus and other information to customers and for obtaining selections and other information from customers, and recorder 34 may process or record voice interactions with customers. It may be appreciated that contact center 10 presented in FIG. 3 is not limiting and may include any blocks and infrastructure needed to handle voice, text (e.g. SMS (short message service), WhatsApp messages, chats, social media comments/posts, etc.) video and any type of interaction with customers.

User equipment 5 and agent terminals 6 may include computing or telecommunications devices such as personal computers or other desktop computers, conventional telephones, cellular telephones, portable or tablet computers, smart or dumb terminals, etc., and may include some or all of the components such as a processor shown in FIG. 2.

Figure 4A:
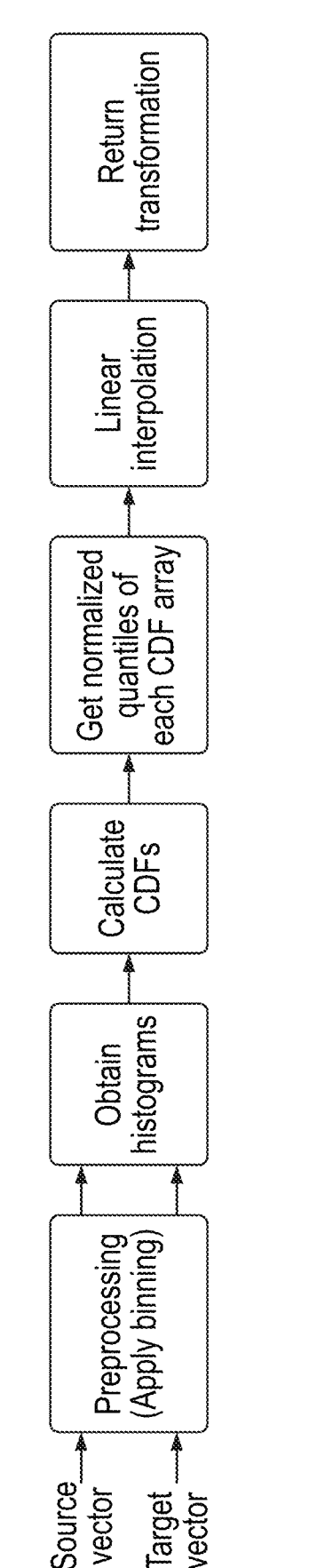
FIGS. 4A and 4B show schematic flowcharts according to some embodiments of the invention.
Figure 4B:
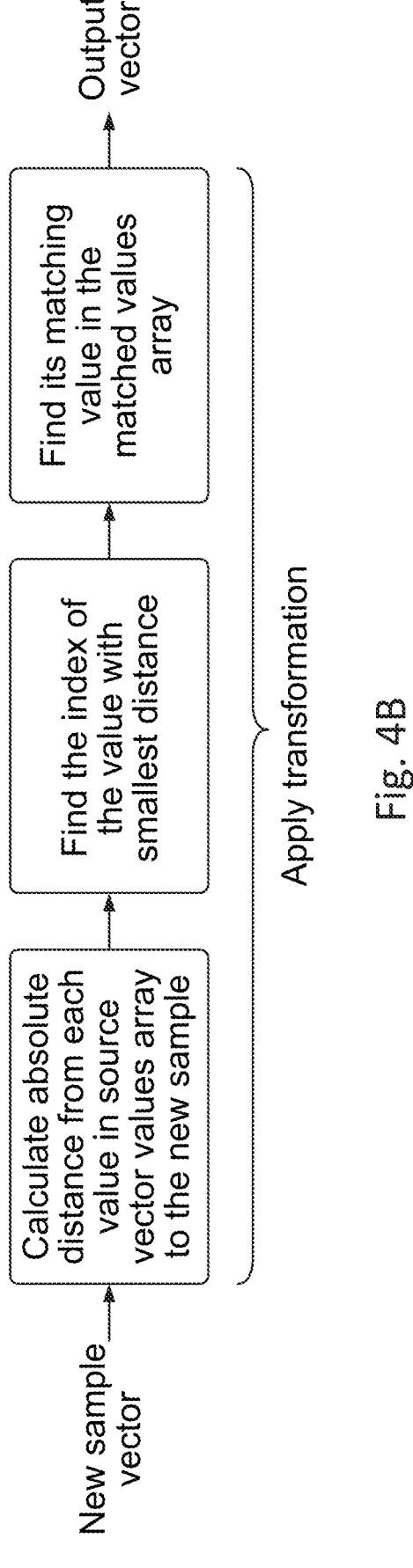

FIGS. 4A and 4B show schematic flowcharts of method steps according to some embodiments of the invention. Some embodiments may include learning a transformation function and may include applying the transformation function to a new sample. The transformation function may map a score distribution from a model after a change to the model (e.g. update to the model, change of model type etc.) to a standard score distribution that existed before the change. For example, embodiments of the invention may map a first set of output values of a first learning model to a distribution of a second set of output values of a second learning model. The second learning model may be a previous version of the first learning model, and the second set of output values may be historic output values having a previous standard score distribution.

In some embodiments the change may involve a change of model type. For example, the first learning model may be of a first type and the second learning model may be of a second type possibly different from the first. The first and/or second type may be, for example, one of a convolutional neural network (CNN), a support vector machine (SVM), k-nearest neighbor (KNN) model, generative additive model (GAM), a decision tree, neural network, or deep neural network. It will be understood that the first and second types may be the same, or may be different. For example, in the case of the same model type, the first and second learning models may differ by calibration or configuration of the model, such as a different initial set of starting weights, different bias value, updated improvements to NLP techniques, the addition of additional processors (e.g. computer processing unit (CPU) and/or graphics processing unit (GPU)), different input format (e.g. change from audio recording to audio transcription) etc. As discussed, models may change due to advances in the relevant field of technology, for example advances in automatic speech recognition, and the relationship between the first and second model used in a specific application (e.g. NLP analysis) may be close (e.g. only a few parameters changed) to distinct (e.g. a new model type such as moving from convolutional neural network to support vector machine). Embodiments of the invention may allow existing thresholds, benchmarks, and/or baselines defined for a previous (e.g. second) model to be maintained without the need for new experimentation and goal-setting to get comparable data insights following a change to a new (e.g. first) model by mapping or transforming a distribution of the output of the new model to that of the previous model's output distribution.

Learning the transformation function may include receiving as input a source vector and a target vector. It will be understood that a vector may represent a set of values. A set of source values (e.g. a source vector) may represent output values (e.g. prediction scores) from the model after a change to the model. A set of target values (e.g. a target vector) may represent output values (e.g. prediction scores) from the model before a change to the model. A prediction score as output by a model used by embodiments of the invention may, for example, represent a likelihood (e.g. probability) that the agent answered an interaction in such a way as to produce high customer sentiment: for example the agent was helpful and polite such that the customer was highly satisfied with the service they received. The prediction scores may, for example, range from 0 (e.g. customer was not satisfied/low or bad sentiment) to 1 (e.g. customer was satisfied/high or good sentiment) with intermediate values such as 0.5 representing a mix of good and bad sentiment. Other prediction scores and ranges may be used. The machine learning models may be used in a contact center to analyze input data relating to interactions, such as transcripts of phone conversations, and analyze them, for example using automatic speech recognition techniques, to determine the sentiment of the interaction, which may be expressed by the discussed prediction score. These prediction scores may be used to improve the service that the contact center provides, for example by providing additional training to agents with low sentiment, and may be used for other purposes such as agent compensation. Embodiments of the invention may allow for monitoring and improvements using the same scale when the models are improved or changed (e.g. due to advances in the model technology or algorithms). While discussed herein in the context of agents, interactions and contact centers, embodiments of the invention may be used for other purposes where mapping/transformation of output data between different model types is required.

Learning the transformation function may include preprocessing of the input data (e.g. the set of source and target values). Because the input data may be continuous (e.g. represented by floating point arithmetic) as opposed to discrete, the preprocessing may include binning of the input data. The binning may involve rounding each value (e.g. score) of the set of values to a nearest bin size of a configurable bin size S. Binning may allow for the two input vectors to be placed on the same or similar scale ranges.

Learning the transformation function may include obtaining one or more histograms, for example obtaining a histogram of the set of source values and a histogram of the set of target values). The histograms may be received by, or may be directly generated by, systems according to the present invention, for example by a computing device as shown in FIG. 2.

Learning the transformation function may include calculating a cumulative distribution function (CDF) for the set of source values and for the set of target values. The CDF may be calculated using the histogram for the set of source values and the histogram for the set of target values. As will be known to persons skilled in the art of probability theory and statistics, the cumulative distribution function of a real-valued random variable X evaluated at x, is the probability that X takes a value which is less than or equal to x. Other distribution functions may be used by embodiments of the invention, such as a complementary cumulative distribution function (also known as tail distribution/exceedance), inverse distribution function (also known as quantile function), and/or multivariate distribution function such as a joint cumulative distribution function for two random variables. Thus, in some embodiments, a method for mapping a first set of output values of a first learning model to a distribution of a second set of output values of a second learning model may include calculating a first distribution function for a set of source values and calculating a second distribution function for a set of target values.

Learning the transformation function may include calculating one or more quantiles for each of the distribution functions. For example, in some embodiments, a method for mapping a first set of output values of a first learning model to a distribution of a second set of output values of a second learning model may include calculating a first set of quantiles for the first distribution function and calculating a second set of quantiles for the second distribution.

In some embodiments, the quantiles may be normalized quantiles, obtained, for example, by dividing the first distribution function by the size of the set of source values (e.g., the number of values in the set) and dividing the second distribution function by the size of the set of target values.

Learning the transformation function may include using linear interpolation, the formula for which will be known to the skilled person. For example, some embodiments of the invention may interpolate the first set of quantiles and the second set of quantiles evaluated at the target values. An output of the linear interpolation may include a first array and a second array. For example, the first array may be an array of source vector values, such as source vector unique values. The second array may be a matched interpolated values array (e.g. a scores mapping array).

The linear interpolation may also output a transformed source vector, which may represent a mapping that can be stored and used for new inputs.

When a new sample input is received, such as a new set of values output from the new model (e.g. first learning model), embodiments of the invention may calculate an absolute distance from each value in the source values array to the new set of values (e.g. first set of output values of the first learning model).

Embodiments of the invention may determine a corresponding value in the matched interpolated values array corresponding to a value in the source values array which has the smallest absolute distance. For example, embodiments of the invention may determine an array index of the value in the source vector unique values array which has the smallest absolute distance and then determine the corresponding value in the matched interpolated values array corresponding to the determined array index.

Embodiments of the invention may then output a set of matched values. This set of matched values may have a distribution which matches, or is otherwise mapped to, a distribution of a historic set of output values. For example, the first set of output values of the first learning model (e.g. new version) may have a distribution corresponding to the distribution of the second set of output values of the second learning model (e.g. previous version).

Applying the transformation function may also include transforming output data of a first learning function to a distribution of output data of a second learning function. In some embodiments this may include calculating, e.g. by at least one processor, a first cumulative distribution function (CDF) for a set of source data from the first learning function, and a second cumulative distribution function (CDF) for a set of target data from the second learning function. Some embodiments may include using the first and second CDFs, e.g. by the at least one processor, in a linear interpolation evaluated at each value of the set of target data to obtain a transformed set of data, and may include outputting the transformed set of data.

For example, embodiments of the invention may map an output of a first model such as [−17, −5, +10], which in general has a range from −∞ to +∞, to match a distribution/ range of a different model, such as a previous model which output vector values between 0 and 1. Such a mapping may transform the vector [−17, −5, +10] to a new vector of matched values such as [0.00001, 0.001, 0.9]. Other mappings resulting in different matched vectors are possible.

With reference to FIG. 5, which shows a flowchart of a method according to some embodiments of the invention, there is thus provided a computer implemented method 500 (e.g. implemented by a computer processor such as the computing device of FIG. 2) for mapping a first set of output values of a first learning model to a distribution of a second set of output values of a second learning model. The first and second learning models may be one of the same type, or a different type. For example, the type may be one of: a convolutional neural network (CNN), a support vector machine (SVM), k-nearest neighbor (KNN), generative additive model (GAM), a decision tree, neural network, or deep neural network.

In some embodiments, the second learning model is a previous version of the first learning model. The first and second (e.g. previous) learning models may differ by calibration or configuration of the model, such as a different initial set of starting weights, different bias value, updated improvements to NLP techniques, the addition of additional processors (e.g. computer processing unit (CPU) and/or graphics processing unit (GPU)), different input format (e.g. change from audio recording to audio transcription) etc.

Method 500 may include aspects of FIG. 4A related to learning the transformation/mapping function, as well as aspects of FIG. 4B related to applying the transformation/ mapping function.

Method 500 may include calculating a first distribution function for a set of source values (Step 502). The first distribution function may be, for example, one of a cumulative distribution function, complementary cumulative distribution function (also known as tail distribution/exceedance), inverse distribution function (also known as quantile function), and/or multivariate distribution function such as a joint cumulative distribution function for two random variables.

Method 500 may include calculating a second distribution function for a set of target values (Step 504). The second distribution function may be, for example, one of a cumulative distribution function, complementary cumulative distribution function (also known as tail distribution/exceedance), inverse distribution function (also known as quantile function), and/or multivariate distribution function such as a joint cumulative distribution function for two random variables. The second distribution function may be the same as, or may be different from, the first distribution function.

The set of source values (e.g. a source vector) may represent output values (e.g. sentiment prediction scores predicted by an ASR model) from the model after a change to the model (e.g. due to improvements to the model which increase accuracy of intended meaning, handle different accents etc.). A set of target values (e.g. a target vector) may represent output values (e.g. sentiment prediction scores) from the model before a change to the model.

According to some embodiments, the first and second set of output values of the first and second learning model include prediction scores for one or more monitored variables monitored based on natural language processing (NLP) of at least one of a transcript, or an audio recording, of an interaction between an agent and a customer. The interaction may be, for example, one of: a phone conversation, one or a plurality of emails, one or a plurality of text messages, one or a plurality of social media comments, one or a plurality of web chat messages, an audio transcription, or a textual representation of a digital channel (e.g. a text file representing a digital channel, such as email, webchat, social media comments/post etc.). Social media comments/posts may be from one or more social media platforms, such as Facebook, Instagram, Twitter, LinkedIn, YouTube, or the like. Output values based on other data, not involving a contact center or interactions, may be used.

According to some embodiments, the set of source values and/or the set of target values include a representation of continuous data values (e.g. represented by floating point arithmetic). In some embodiments, calculating the first and second distribution functions includes calculating a first cumulative distribution function (CDF) for a first plurality of histogram scores for the set of source values, and calculating a second CDF for a second plurality of histogram scores for the set of target values.

Method 500 may include calculating a first set of quantiles or cut points for the first distribution function, and a second set of quantiles or cut points for the second distribution function (Step 506). According to some embodiments, calculating the first and second sets of quantiles includes dividing the first distribution function by the size of the set of source values and dividing the second distribution function by the size of the set of target values.

Method 500 may include using the first and second set of quantiles in a linear interpolation of the set of target values to obtain a source values array and a matched interpolated values array (Step 508). The values in the matched interpolated values array may be considered "matched" in the sense that they have the relevant probabilities according to the required range (such as $-\infty$ to $+\infty$, or 0 to 1, for example).

According to some embodiments, the set of matched values is used in automatically determining agent performance based on one or more thresholds defined for the distribution of the second set of output values of the second learning model. For example, the set of matched values may be used in automatically determining agent performance based on one or more thresholds previously defined for the distribution of a set of historic output values for a previous version of the learning model. Determining agent performance may influence one or more business decisions such as agent compensation (e.g. salary, bonus), training (e.g. a poorly performing agent may require education on a particular topic) and/or scheduling (e.g. a poorly performing agent may be scheduled for a less busy shift). These business decisions may be automated based on the determined agent performance.

As an example, assume that historically, for a previous model, an agent consistently received a sentiment prediction score of 0.6 and that a threshold was defined as 0.5 for adequate performance. Following improvements to the model, the model now outputs a sentiment prediction score for that same agent of 3, even though the agent is not handling customer interactions any differently, for example because the new model has a different output distribution. If agent compensation is related to performance over and above the defined thresholds the agent will be seen to be vastly improved despite not having actively changed their performance. Embodiments of the invention allow the outputs of the new model to be mapped to a same or similar distribution as the old model, thus preserving the relevancy of the previously defined thresholds. For example, following scores normalization in accordance with embodiments of the invention, the agent may have a normalized prediction score of 0.55 (e.g. obtained from the matched values array as described above), which is more suitable to be compared with the existing threshold of 0.55 (e.g. in contrast to the raw output value of the new model of 3) and still shows that the agent is performing adequately, as would be expected if the agent has not changed the way they work.

Method 500 may include calculating a distance, e.g. an absolute distance $|x_1-x_2|$, from each value in the source values array to the first set of output values of the first learning model (Step 510). Other distance measurements may be used.

Method 500 may include determining a corresponding value in the matched interpolated values array corresponding to a value in the source values array which has the smallest distance or absolute distance (Step 512). For example, embodiments of the invention may determine an array index of the value in the source vector unique values array which has the smallest absolute distance and then determine the corresponding value in the matched interpolated values array corresponding to or having the same determined array index.

Method 500 may include outputting a set of matched values (Step 514). This set of matched values may have a distribution which matches, or is otherwise mapped to, a distribution of a historic set of output values. For example, the first set of output values of the first learning model (e.g. new version) may have a distribution corresponding to the distribution of the second set of output values of the second learning model (e.g. previous version).

In some embodiments, the first and second set of output values of the first and second learning models include prediction scores for one or more monitored variables (e.g. customer sentiment (e.g. happy/angry), agent sentiment (e.g. professional/rude)) monitored based on natural language processing (NLP) of at least one of a transcript, or an audio recording, of an interaction between a customer and an interactive voice response (IVR), and the set of matched values is used in automatically routing a call based on one or more thresholds defined for the distribution of the second set of output values of the second learning model.

Method 500 may be an improvement over prior technology by being a low-effort solution compared to existing approaches. For example, method 500 may have O(n) runtime, where n is the number of samples to match.

Methods other than method 500 may be used, for example which differ in one or more steps. For example, according to some embodiments, a method for transforming output data of a first learning function to a distribution of output data of a second learning function includes: calculating, by at least one processor, a first cumulative distribution function (CDF) for a set of source data from the first learning function, and a second cumulative distribution function (CDF) for a set of target data from the second learning function; using the first and second CDFs, by the at least one processor, in a linear interpolation evaluated at each value of the set of target data to obtain a transformed set of data; and outputting the transformed set of data. The learning function may be, for example, a machine learning model, parametric function, or NLP classifier. In some embodiments, the second learning function is a previous version of the first learning function. For example, the first learning function is an updated version/configuration of the second learning function.

Some embodiments include a system for mapping a first set of output values of a first learning model to a distribution of a second set of output values of a second learning model. The system may include at least one processor, and a memory containing instructions which, when executed by the at least one processor, cause the at least one processor to carry out one or more methods (such as method 500 of FIG. 5) described herein. The at least one processor and memory may be components of a computing device, such as computing device 100 shown in FIG. 2.

The at least one processor may calculate a first distribution function for a set of source values. The distribution function may be one of the distributions described herein, for example one of a cumulative distribution function, complementary cumulative distribution function (also known as tail distribution/exceedance), inverse distribution function (also known as quantile function), and/or multivariate distribution function such as a joint cumulative distribution function for two random variables.

The at least one processor may calculate a second distribution function for a set of target values. The second distribution function may be, for example, one of a cumulative distribution function, complementary cumulative distribution function (also known as tail distribution/exceedance), inverse distribution function (also known as quantile function), and/or multivariate distribution function such as a joint cumulative distribution function for two random variables. The second distribution function may be the same as, or may be different from, the first distribution function.

As described herein, a set of source values (e.g. a source vector) may represent output values (e.g. prediction scores) from the learning model after a change to the model, e.g. outputs from the first learning model. A set of target values (e.g. a target vector) may represent output values (e.g. prediction scores) from the model before a change to the model, e.g. outputs of the second learning model.

According to some embodiments, the set of source values and the set of target values include a representation of continuous data values (e.g. represented by floating point arithmetic), and the processor is configured to calculate the first and second distribution functions by calculating a first cumulative distribution function (CDF) for a first plurality of histogram scores for the set of source values, and calculate a second CDF for a second plurality of histogram scores for the set of target values.

The at least one processor may calculate a first set of quantiles for the first distribution function, and a second set of quantiles for the second distribution function. In some embodiments, the at least one processor is configured to calculate the first and second sets of quantiles by dividing the first distribution function by the size of the set of source values and by dividing the second distribution function by the size of the set of target values.

The at least one processor may use the first and second set of quantiles in a linear interpolation of the set of target values to obtain a source values array and a matched interpolated values array.

The at least one processor may calculate an absolute distance from each value in the source values array to the first set of output values of the first learning model. The at least one processor may determine a corresponding value in the matched interpolated values array corresponding to a value in the source values array which has the smallest said absolute distance. For example, in some embodiments, the at least one processor determines an array index of the value in the source vector unique values array which has the smallest absolute distance and then determines the corresponding value in the matched interpolated values array corresponding to the determined array index.

The at least one processor may output a set of matched values. These matched values may map the first set of output values of the first learning model to the distribution of the second set of output values of the second learning model.

In some embodiments, the set of matched values is used in automatically determining agent performance based on one or more thresholds defined for the distribution of the second set of output values of the second learning model. As discussed herein, the agent performance may affect one or more business decisions which may be made automatically by a computing device such as computing device 100 shown in FIG. 2

In some embodiments, the first and second set of output values of the first and second learning models include prediction scores for one or more monitored variables monitored based on natural language processing (NLP) of at least one of a transcript, or an audio recording, of an interaction between an agent and a customer. The interaction may be, for example, one of: a phone conversation, one or a plurality of emails, one or a plurality of text messages, one or a plurality of social media comments, one or a plurality of web chat messages, an audio transcription, and/or a textual representation of a digital channel.

In some embodiments, the first and second set of output values of the first and second learning models include prediction scores for one or more monitored variables monitored based on natural language processing (NLP) of at least one of a transcript, or an audio recording, of an interaction between a customer and an interactive voice response (IVR). The at least one processor may be configured to automatically use the set of matched values to automatically route a call based on one or more thresholds defined for the distribution of the set of output values (e.g. historic values) of the second learning model (e.g. previous version of the model).

Figure 6:
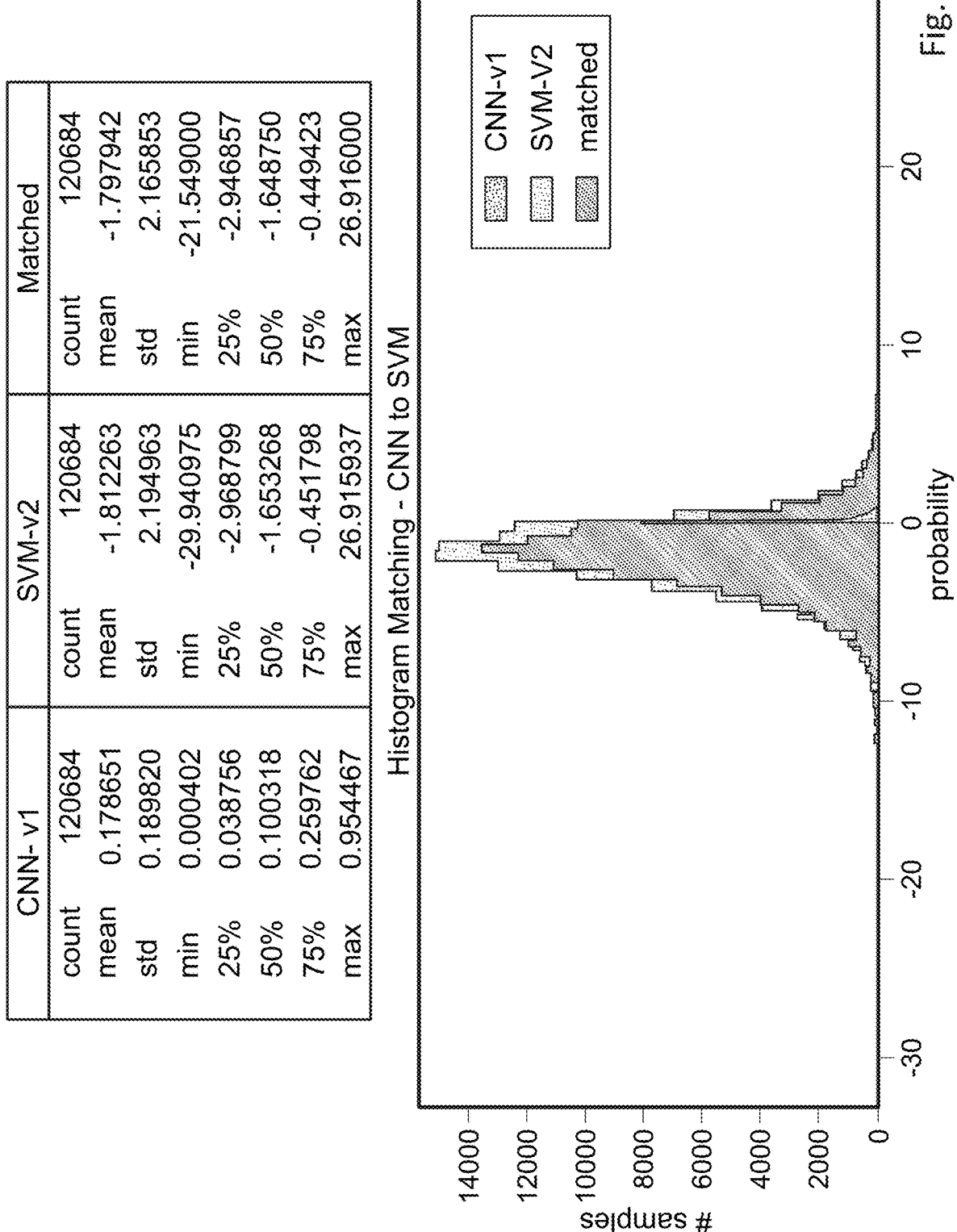
FIG. 6 shows experimental results of matching a CNN scores histogram to an SVM scores histogram, according to some embodiments of the invention.

FIG. 6 shows experimental results of matching a CNN scores histogram to an SVM scores histogram, according to some embodiments of the invention. The experimental results show that the two different vector ranges, $-\infty$ to $+\infty$ and 0 to 1, were successfully matched (e.g. the probability distributions were mapped to fit the required target range). Given that these ranges may be considered to be the most complex distribution ranges, a successful mapping between these ranges allows for extension to other more general ranges. Further, given that the matched histogram in FIG. 6 has a similar profile or shape to the SVM model indicates an accurate mapping to the output of the SVM model is achieved by embodiments of the invention.

Figures 7A, 7B:
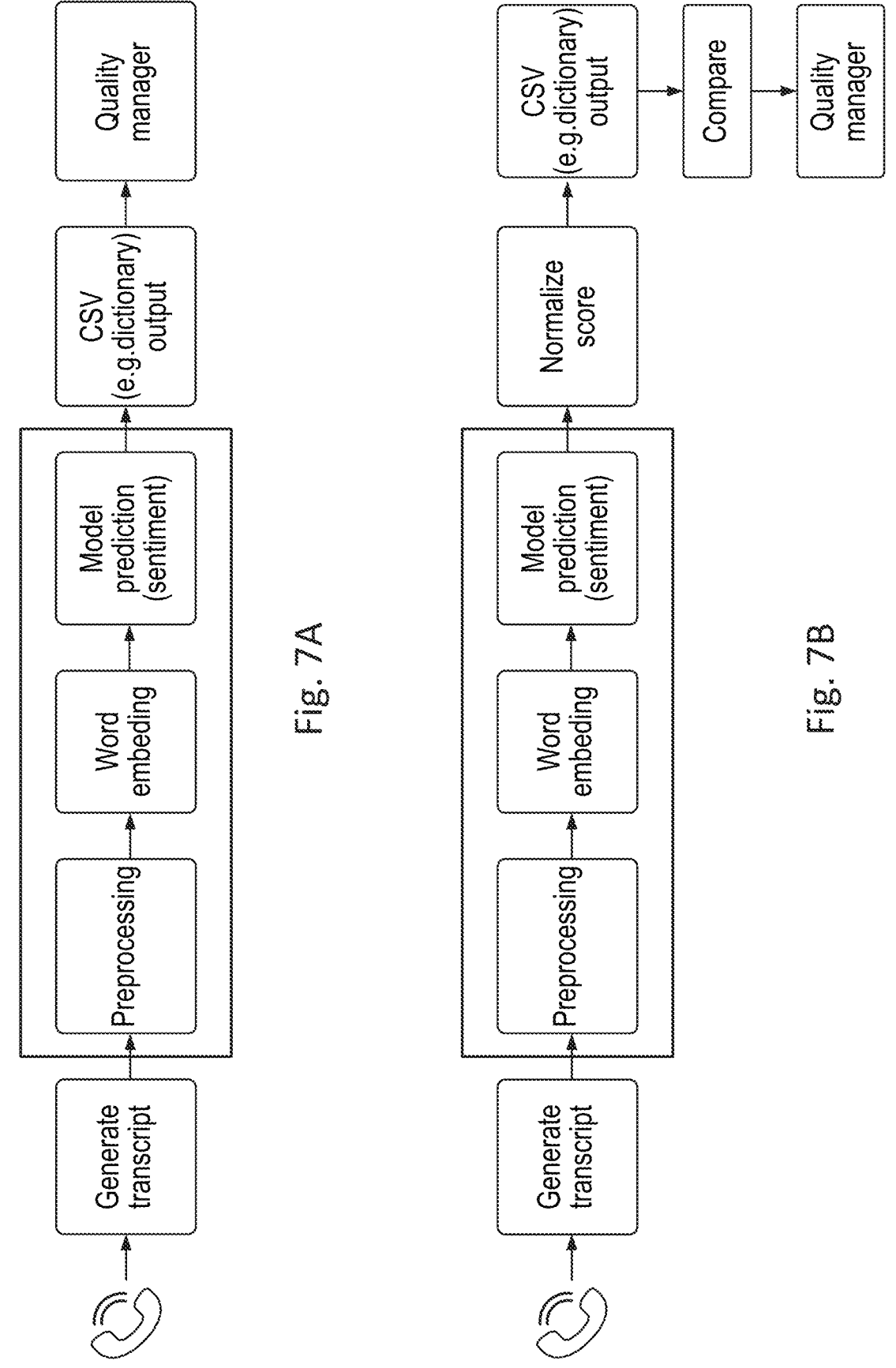
FIGS. 7A and 7B show example flows before and after the implementation of embodiments of the invention.

FIGS. 7A and 7B show example flows before and after the implementation of embodiments of the invention. For example, in a typical existing flow shown by FIG. 7A, once an interaction, such as a call in this example, has concluded then: a transcript may be generated; specific characters may be removed (such as stopwords, filler phrases (e.g. "um", "mm", "huh?", "ah", "like", "you know" etc.), numbers, and unnecessary characters); a numeric representation may be created representing a specific length per interaction (e.g. vector length may be configurable); a trained model (such as Enlighten AI by NICE Ltd.) may predict the probability to get 1-positive sentiment, or 0-negative sentiment and may save these probabilities as a comma-separated value (CSV) file; and a quality manager (QM) may manually review the CSV and according to their business needs will decide per threshold on agent performance and any relevant compensation.

In FIG. 7B, which shows how embodiments of the invention alter the typical flow of FIG. 7A, once an interaction, such as a call in this example, has concluded then: a transcript may be generated; specific characters may be removed; a numeric representation may be created representing a specific length per interaction; a trained model may predict the probability to get 1-positive sentiment, or 0-negative sentiment and may save these probabilities as a CSV file; check to see if historically other models with different probability ranges on the same datasets were used and if so normalize the scores using the transformation function according to embodiments of the invention; and predict and create a new CSV file for the normalized scores where the output scores are on the same scale as before, and automatically compare historical results and notify the QM if there should be any changes to agent compensation.

In some embodiments, an automatic comparison may be made between a current prediction (e.g. output of a model following a change to the model) and a historic prediction (e.g. output of a model before a change to the model). As an example, an automatic comparison may take as input two dictionaries (key,value): Key=interaction_id (float number)+agent_id(integer number), Value=prediction (integer number between 0 to 1). The output of the automatic comparison may be, in the case of no changes between the models, an empty dictionary. In other cases, the output may be a dictionary with Key=agent_id (integer number), value=numeric percentage (e.g. integer). Data representations other than dictionaries may be used.

For example, as part of an automatic comparison, a system or method may receive two dictionaries as inputs: (current prediction after normalization, and historic predictions). The system/method may then go over each key within the dictionary (as both may have the same keys) and compare their values. If there are values that pass a threshold (e.g. 0.5) then the shifts in the total amounts of keys may be used to create a summary with the new total amount of values above 0.5, which may be grouped by the Agent identity (which may act as an internal identification), in this case the result may be a dictionary with keys corresponding to the Agent identification id and the value may be the difference or "delta" of how many interactions passed the 0.5 threshold in terms of a percentage of the total number of interactions handled by an agent in a given time period: for example an agent who handles ten (10) interactions, two (2) of which are assessed to pass the score threshold of 0.5 results in an output percentage of 20% because two out of ten interactions passed the threshold. If there are no changes (e.g. no values passing the 0.5 threshold) then no action may be taken (e.g. the quality manager does not need to be informed that there has been no change in quality).

As a numeric example, assume that the historical prediction has the following dictionary {"1234_1":0.45, "1235_1":0.3, "1236_2":0.1}. This dictionary represents three interactions with interaction IDs 1234, 1235, and 1236. Interactions 1234 and 1235 were handled by agent 1, and interaction 1236 was handled by agent 2, hence the notation 1234_1, 1235_1, and 1236_2. For a defined threshold of 0.0.5, agent 1 has zero interactions which pass the threshold, and the same for agent 2. For the current prediction, assume a dictionary of {"1234_1":0.51, "1235_1":0.3, "1236_2": 0.1}. In general the key values may be different, but for the purposes of illustration they are presented here as the same. Following the change to the model agent 1 now has one interaction of two (e.g. 50%) which pass the 0.5 threshold, and agent 2 remains the same. The results dictionary may be output as {"1":50} where key=agent_id(1), value=50%.

In some embodiments, an automated check and notify function may check for changes in a results dictionary, and may send an automated notification (e.g. to a quality manager) if there are significant changes (the changes may be classed as significant or not based on a predefined threshold, e.g. a +/−change of 10% or more may be significant). For example, embodiments of the invention may send a notification email message if values in the dictionary are equal to or above 50%. In some embodiments, if there are negative values, the notification email may be sent with high importance (e.g. to the quality manager or salary department) to notify that there are negative changes with respect to the historical prediction (the historical prediction being, for example, the basis upon which performance was previously assessed).

As a numeric example, assume a dictionary with key=agent_id(1), value=−30%, key=agent_id(2), value=5%, e.g. {"1":−30, "2":5}. This dictionary represents that agent 1 had a minus percentage (e.g. they had 30% fewer interactions which pass the predefined threshold: for example previously they had 20 out of 20 interactions which passed the threshold, and now they only have 14 out of 20 interactions which pass the threshold representing a reduction of 30%) and so historically the agent received compensation (such as, for example, a bonus) as more than half (e.g. greater than 50%) of their interactions were above the threshold, however now (e.g. based on changes to an ASR model which evaluates agent and/or customer sentiment) the agent is no longer performing such that 50% or more of their interactions pass the pre-defined threshold and so the quality manager may receive an automated notification that following normalization of the new data following changes to the model agent 1 should not receive the same level of compensation as previously. As discussed herein, compensation may also relate to training (e.g. a poorly performing agent may require education on a particular topic) and/or scheduling (e.g. a poorly performing agent may be scheduled for a less busy shift). For example, in the case of agent 1 in this example, the quality manager may arrange for additional training for agent 1 to reflect new practices following changes in the way that ASR models identify and interpret rude, impatient, or condescending statements.

Some embodiments of the invention may include providing automatic WFM functionality, such as automatically adjusting a work schedule based on the output. For example, assume a historic dictionary of {"1234_1":0.45, "1235_1": 0.3, "1236_2":0.7} and a current prediction dictionary of {"1234_1":0.51, "1235_1":0.3, "1236_2":0.7}. The resulting comparison dictionary may be {"1":50} as previously described. This may mean that agent 1 had better sentiment (e.g. resulting in better customer experience). As such, agent 1 may be automatically assigned to the busiest shifts (e.g. at peak times). Embodiments of the invention may collect data on the periods of time when the agent got the most positive/the largest percentage change and may then automatically assign the agent to those times (and may avoid assigning agent 2 to busy times in favor of the better performing agent 1).

Some embodiments of the invention may automatically route calls based on the output. For example, assuming a historical prediction dictionary of {"1234_1":0.45, "1235_1":0.3, "1236_2":0.7} corresponding to times {"1234_1": Monday 9:05 AM, "1235_1":Monday 11:10 AM, "1236_2": Monday 10:50 AM} and a current prediction of {"1234_1":0.51, "1235_1":0.3, "1236_2":0.7} corresponding to times {"1234_1": Monday 9:05 AM, "1235_1":Monday 11:10 AM, "1236_2": Monday 10:50 AM} (in general the key values may be different, but for the purposes of illustration they are presented here as the same) then the same output result dictionary of {"1":50} may be obtained. In this case it can be seen that Monday morning shifts are better for agent 1, and so embodiments of the invention may use IVR to automatically direct calls with high priority to this agent due to the fact that agent 1 has better sentiment (e.g. works to a higher quality). For several agents that also have a high percentage for this time period the call may be automatically moved to their queue in the IVR and the priority may be according to the agents' overall percentage: for example if agent 1 has an overall score of 60% and agent 2 has an overall score of 20% then Agent 1 will have the highest priority and so agent 1 may get the call first.

Embodiments of the invention may improve the technologies of automatic speech recognition, call routing, machine learning consistency, and computer use and automation analysis by using specific algorithms to analyze large pools of data, a task which is impossible, in a practical sense, for a person to carry out.

Although discussed in the context of contact centres and agent compensation, the disclosed systems and methods for mapping a first set of output values of a first learning model to a distribution of a second set of output values of a second learning model may find applicability to any technical field where consistency of distribution of data which is to be compared to existing thresholds before and after a change to the model. For example, mapping between different types and/or versions of a machine learning model may have applicability to meteorological data, traffic data, physiological data, and many others.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A computer implemented method for mapping a first set of output values of a first learning model to a distribution of a second set of output values of a second learning model, the method comprising, using a computer processor:

calculating a first distribution function for a set of source values;

calculating a second distribution function for a set of target values;

calculating a first set of quantiles for the first distribution function, and a second set of quantiles for the second distribution function;

using said first and second set of quantiles in a linear interpolation of the set of target values to obtain a source values array and a matched interpolated values array;

calculating an absolute distance from each value in the source values array to the first set of output values of the first learning model;

determining a corresponding value in the matched interpolated values array corresponding to a value in the source values array which has the smallest said absolute distance; and outputting a set of matched values, wherein the first and second learning models are one of: the same type, or a different type, and wherein the type is one of: a convolutional neural network (CNN), a support vector machine (SVM), k-nearest neighbor (KNN), generative additive model (GAM), a decision tree, neural network, or deep neural network.

2. The computer implemented method of claim 1, wherein the set of source values and the set of target values comprise a representation of continuous data values, and wherein calculating said first and second distribution functions comprises calculating a first cumulative distribution function (CDF) for a first plurality of histogram scores for the set of source values, and calculating a second CDF for a second plurality of histogram scores for the set of target values.

3. The computer implemented method of claim 1, wherein calculating said first and second sets of quantiles comprises dividing the first distribution function by the size of the set of source values and dividing the second distribution function by the size of the set of target values.

4. The computer implemented method of claim 1, wherein the first and second set of output values of the first and second learning model comprise prediction scores for one or more monitored variables monitored based on natural language processing (NLP) of at least one of a transcript, or an audio recording, of an interaction between an agent and a customer.

5. The computer implemented method of claim 4, wherein the interaction is one of: a phone conversation, one or a plurality of emails, one or a plurality of text messages, one or a plurality of social media comments, one or a plurality of web chat messages, an audio transcription, or a textual representation of a digital channel.

6. The computer implemented method of claim 4, wherein the set of matched values is used in automatically determining agent performance based on one or more thresholds defined for the distribution of the second set of output values of the second learning model.

7. The computer implemented method of claim 1, wherein the first and second set of output values of the first and second learning models comprise prediction scores for one or more monitored variables monitored based on natural language processing (NLP) of at least one of a transcript, or an audio recording, of an interaction between a customer and an interactive voice response (IVR), and wherein the set of matched values is used in automatically routing a call based on one or more thresholds defined for the distribution of the second set of output values of the second learning model.

8. A system for mapping a first set of output values of a first learning model to a distribution of a second set of output values of a second learning model, the system comprising:

at least one processor; and a memory containing instructions which, when executed by the at least one processor, cause the at least one processor to:

calculate a first distribution function for a set of source values;

calculate a second distribution function for a set of target values;

calculate a first set of quantiles for the first distribution function, and a second set of quantiles for the second distribution function;

use said first and second set of quantiles in a linear interpolation of the set of target values to obtain a source values array and a matched interpolated values array;

calculate an absolute distance from each value in the source values array to the first set of output values of the first learning model;

determine a corresponding value in the matched interpolated values array corresponding to a value in the source values array which has the smallest said absolute distance; and output a set of matched values, wherein the first and second learning models are one of: the same type, or a different type, and wherein the type is one of: a convolutional neural network (CNN), a support vector machine (SVM), k-nearest neighbor (KNN), generative additive model (GAM), a decision tree, neural network, or deep neural network.

9. The system of claim 8, wherein the set of source values and the set of target values comprise a representation of continuous data values, and wherein the processor is configured to calculate said first and second distribution functions by calculating a first cumulative distribution function (CDF) for a first plurality of histogram scores for the set of source values, and calculate a second CDF for a second plurality of histogram scores for the set of target values.

10. The system of claim 8, wherein the at least one processor is configured to calculate said first and second sets of quantiles by dividing the first distribution function by the size of the set of source values and by dividing the second distribution function by the size of the set of target values.

11. The system of claim 8, wherein the first and second set of output values of the first and second learning models comprise prediction scores for one or more monitored variables monitored based on natural language processing (NLP) of at least one of a transcript, or an audio recording, of an interaction between an agent and a customer.

12. The system of claim 11, wherein the interaction is one of: a phone conversation, one or a plurality of emails, one or a plurality of text messages, one or a plurality of social media comments, one or a plurality of web chat messages, an audio transcription, or a textual representation of a digital channel.

13. The system of claim 11, wherein the set of matched values is used in automatically determining agent performance based on one or more thresholds defined for the distribution of the second set of output values of the second learning model.

14. The system of claim 8, wherein the first and second set of output values of the first and second learning models comprise prediction scores for one or more monitored variables monitored based on natural language processing (NLP) of at least one of a transcript, or an audio recording, of an interaction between a customer and an interactive voice response (IVR), and wherein the at least one processor is configured to automatically use the set of matched values to automatically route a call based on one or more thresholds defined for the distribution of the set of output values of the second learning model.

* * * * *